3,424,773
TRANSITION METAL COMPLEXES OF
$(B_{10}H_{10}CNH_3)^{-2}$, $(B_{10}H_{10}COH)^{-3}$ AND DERIVATIVES THEREOF
Walter H. Knoth, Jr., Mendenhall, Pa., assignor to E. I. du Pont de Nemours and Company, Wilmington, Del., a corporation of Delaware
No Drawing. Filed Oct. 4, 1966, Ser. No. 584,082
U.S. Cl. 260—429     12 Claims
Int. Cl. C07f 5/04

This invention relates to novel compounds containing the entity $B_{10}H_{10}CNH_2{}^{3-}$ or its N-protonated or N-alkylated derivatives and to processes for preparing them. More specifically, the invention concerns compounds containing two such entities in conjunction with selected transition metal cations.

The anions described above are believed to consist of an eleven-particle icosahedral fragment composed of ten boron atoms and one carbon atom. This structure results in a void or vacant position at the twelfth position of the icosahedron, and it is believed that the transition metal is bonded to the five atoms positioned around the vacant position. These five atoms around the vacant position form an open pentagonal face which resembles the cyclopentadienide anion in its geometry and bonding properties. Thus the compounds of this invention can be regarded as "sandwich compounds" in which the transition metal is bonded to two sets of the 5 atoms forming the open pentagonal face, i.e., the transition metal is associated with two of the anions. Alternatively, the structure of the novel compounds of this invention can be regarded as a spirocage structure, with each of the two cages being an icosahedron and transition metal atom being the spiro atom.

The novel compounds of the invention can be represented by the formula $$M_a[B_{10}H_{10}CNRR'_m)M'(B_{10}H_{10}CNRR'_n)]$$

wherein the components are discussed in detail below.

The entity $(B_{10}H_{10}CNRR')$ is the icosahedral fragment consisting of ten boron (B) atoms and one carbon (C) atom. The nitrogen (N) is attached to the carbon and R and R' are bonded to the nitrogen. R is selected from hydrogen, alkyl of up to 18 carbons, cycloalkyl (including monocyclic and polycyclic cycloalkyl) of 4–30 carbons, or aralkyl of 7–18 carbons; and R' is selected from hydrogen, alkyl of up to 18 carbons, cycloalkyl of 4–18 carbons, or aralkyl of 7–18 carbons, in which the carbon atom bonded to the nitrogen in each of the three groups bears at least one hydrogen, i.e., the R' groups are primary or secondary groups.

$m$ and $n$ are whole numbers selected from 1 or 2, and need not be the same. Thus, when $m$ or $n$ is 2, there are two R' groups attached to the same nitrogen atoms. They can be the same or different, but preferably they are the same.

M' represents the transition metal and is selected from Fe(II), Fe(III), Cr(III), Mn(IV), Co(III), Co(IV) or Ni(IV).

M is one equivalent of a cation which is employed solely to fulfill the valence of the entity in brackets. M is otherwise not a critical portion of the novel compounds. $a$ is a cardinal number of 0–4, inclusive, and represents the number of M cations present and thus also is numerically equal to the valence of the entity in brackets.

The absolute value of the valence of this entity can be defined by the equation $a = 8 - m - n - s$ where $s$ is the oxidation state of the transition metal M'. When $s$ is 4 and each of $m$ and $n$ are 2, $a$ is zero. In these instances, the entity in brackets is not negatively charged and no cation M is present.

The cation M can be an alkali metal, one equivalent of an alkaline earth-metal, silver, $NH_4{}^+$, $QNH_3{}^+$, $QQ'NH_2{}^+$, $QQ'_2NH^+$, $QQ'_3N^+$, $Q_4P^+$, $Q_3S^+$, $Q_4As^+$ or $Q_4Sb^+$ wherein Q' is aliphatically saturated hydrocarbyl bonded to N through aliphatic carbon and contains up to 18 carbon atoms and preferably up to 12 carbon atoms, and Q is aliphatically saturated hydrocarbyl of up to 18 carbon atoms and preferably up to 12 carbons, and when each of $m$ and $n$ is 2, M can be hydrogen. Any two Q and Q' groups in the same cation can also be joined (bonded) to each other directly or through an ethereal oxygen atom to form a divalent, aliphatically saturated hydrocarbyl or oxygen-interrupted (mono-oxa) hydrocarbyl group, of up to 18 carbon atoms and preferably up to 12 carbon atoms. Most preferably this divalent group is alkylene of 4–8 carbon atoms. "Aliphatically saturated hydrocarbyl" is defined as a hydrocarbyl group that does not contain any ethylenic and acetylenic carbon-carbon unsaturation, i.e., the hydrocarbyl groups can be alkyl, cycloalkyl, aryl, alkaryl, or aralkyl. Thus, the term is defined as a hydrocarbyl group in which any unsaturation is aromatic.

Examples of the above M cations include sodium, potassium, rubidium, barium, calcium, strontium, magnesium, cesium, methylammonium, cyclopropylammonium, 1-methylheptylammonium, 2-(1-naphthyl)ethylammonium, octadecylammonium, p-ethylanilinium, diisobutylammonium, dicyclohexylammonium, dinonylammonium, morpholinium, dodecamethyleniminium, triisopropylammonium, N-methylpiperidinium, trihexylammonium, dodecyldimethylammonium, tetraisopentylammonium, heptyltrimethylammonium, trimethylpentylammonium, cyclodecyltrimethylammonium, N,N - didodecylmorpholinium, dimethylanilinium, tetramethylphosphonium, tetranaphthyl phosphonium, ethylpentamethylene-p-tolylphosphonium, dimethyloctadecylsulfonium, methyltetramethylenesulfonium, triethylsulfonium, tertaphenylarsonium, benzylhexadecyldimethylarsonium, dodecyltriethylarsonium, tetramethylstibonium, dibenzyldimethylstibonium, and the like.

Of the above Q and Q' substituted cations, those containing only lower alkyl (1–6 carbon atoms) are preferred, especially tetramethylammonium and trimethylammonium. Preferred cations overall are hydrogen, the alkali metals, especially cesium, and the ones in the preceding sentence.

Compounds of the invention in which M is hydrogen are ordinarily isolated as solvates. Since these compounds are most commonly worked with in aqueous media, the most common types of solvates are hydrates. The exact position of attachment of the solvate molecules is not known, but at least some of them are almost certainly associated with the hydrogen ions. It is to be understood, therefore, that the term "hydrogen," as used here, includes, and in fact essentially always refers to, hydrogen ions solvated with water or other solvent molecules. When M is hydrogen, the degree of solvation of the hydrogen ion is of no particular importance to the present invention. The above usage of the term "hydrogen" is based on nomenclature approved by the International Union of Pure and Applied Chemistry; see J. Am. Chem. Soc., 82, 5529–30 (1960).

Of the M' transition metals, Mn(IV), Fe(III), Co(III), Cr(III) and Ni(IV) are preferred.

The R and R' are exemplified by methyl, isooctyl, isopropyl, 2-ethylhexyl, 1-methylnonyl, octadecyl, 3α-cholestanyl (R only), adamantyl (R only), cyclobutyl, methylcyclopentyl, decahydronaphthyl, benzyl, 1-phenylethyl, p-butyltolyl, p-phenylphenethyl, 4-pyrenylmethyl, tert-butyl (R only), and the like. The carbon atom content is not critical. However, the alkyl groups are preferably of up to 18 carbon atoms, because of availability, and most preferably of up to 8 carbons. The cycloalkyl groups of R and R' include alkylcycloalkyl and cycloalkylalkyl groups. Preferably the R cycloalkyl groups contain from 4 to 30 carbon atoms; while the R' cycloalkyl groups contain 4 to 18 carbon atoms and most preferably 4–8. The aralkyl groups include alkaralkyl and preferably contain from 7–18 carbon atoms.

The novel compounds of this invention are prepared by reacting a boron compound of the formula $$B_{10}H_{12}CNRR_2'$$

wherein R and R' are defined as above, with a base selected from an alkyl-, aryl-, or alkaryllithium of up to 12 carbon atoms, an alkali metal, or an alkali-metal hydride, in the presence of an inert solvent, followed by the addition of a compound selected from $M'''Z_3$ or $M'^VZ_2$ wherein $M'''$ is Fe(III) or Cr(III), and $M'^V$ is Mn(II), Fe(II), Co(II) or Ni(II), and Z is chlorine, bromine or iodine, said steps being carried out at a temperature of between $-50°$ C. and $+100°$ C., and preferably between $0°$ and $60°$ C.

The inert solvent is preferably an aromatic or aliphatic hydrocarbon ether such as tetrahydrofuran, dioxane, ethyl ether, anisole, phenyl ether, 1,2-dimethoxyethane, and the like.

Examples of the organo-lithium reagent include methyllithium, isopropyllithium, tert-butyllithium, heptyllithium, dodecyllithium, phenyllithium, 1- and 2-naphthyllithium, 4-biphenylyllithium, o-, m-, and p-tolyllithium, and 2,4,6-trimethylphenyllithium. Examples of the alkali metals and alkali metal hydrides include sodium, lithium, potassium, rubidium, and their hydrides.

Pressure is not critical and super- or subatmospheric pressures may be employed, but for convenience, atmospheric pressures are preferred. The time of reaction is not critical and will depend upon the reactants used, the temperature employed and the yield of product desired. Nor is the ratio of reactants critical; however, it is preferred to employ at least two equivalents of the base for each equivalent of boron compound in order to abstract two hydrogen ions and transform $B_{10}H_{12}CNRR_2'$ to $$B_{10}H_{10}CNRR_m'^{2-}$$

The reaction is carried out in an inert atmosphere.

The initial products of the reaction will be a salt or a mixture of salts containing the $$[(B_{10}H_{10}CNRR_m')M^V—(B_{10}H_{10}CNRR_n')]$$

anion, wherein $M^V$ is Mn(IV), Fe(II), Fe(III), Cr(III), Co(III) or Ni(IV). When the transition metal reactant is $M'^VZ_2$, the $M'^V$ metal is essentially completely oxidized to a higher valence state with the exception of iron. Thus, when $FeCl_2$ is employed, the reaction mixture may contain compounds wherein both Fe(II) and Fe(III) are present. If desired, air can be bubbled through the reaction mixture prior to isolation of the product to ensure complete oxidation of Fe(II) to Fe(III). The addition of $FeCl_3$ may catalyze such oxidation at this stage. To obtain compounds wherein M is Co(IV), the corresponding compound wherein M' is Co(III) can be oxidized with, e.g., ceric ammonium sulfate.

Isolation of the products is carried out by conventional procedures based upon selective precipitation with a precipitating cation. Preferably the precipitating cation will be $QQ_2'NH^+$, $QQ_3'N^+$ or $Cs^+$ and will be added as the chloride or hydroxide.

Alternatively, products of the invention wherein M' is Co(III) or Ni(IV) can be prepared by reacting $$B_{10}H_{12}CNRR_2'$$

with a 1–50% aqueous or alcoholic solution of an alkali-metal hydroxide, preferably sodium hydroxide, followed by the addition of $CoZ_2$ or $NiZ_2$. The reaction conditions are as described for the preceding process except that here an inert atmosphere is not preferred, and the lower temperature limit is the freezing point of the alkali-metal hydroxide solution. This modification is the preferred procedure for obtaining the Co(III) or Ni(IV) products since the need for inert atmosphere is eliminated.

Once the initial products are obtained, the cation M can be replaced with any other M cation by ordinary cation-exchange techniques. For example, the salts of the invention obtained by the initial procedure described above will usually be the $Cs^+$, $QQ_2'NH^+$, $QQ_3'N^+$, $Q_4P^+$, $Q_3S^+$, $Q_4As^+$ or $Q_4Sb^+$ salts because they are relatively insoluble in water and are thus most easily obtained. These salts can then be subjected to conventional cation-exchange techniques to obtain other salts or acids of the invention. For example, cation-exchange resins can be prepared containing the desired cation (e.g., hydrogen, sodium, ammonium, and the like), and a solution of the salt whose cation is to be replaced passed through. Alternatively, once the acids of this invention (i.e., where M is hydrogen) are obtained, they can be treated with an equivalent amount of a hydroxide containing the desired replacing cation. The water can then be evaporated leaving the desired salt. When the desired cation is $NH_4^+$, $QNH_3^+$, $QQ'NH_2^+$ or $QQ_2'NH^+$, then anhydrous ammonia or the appropriate anhydrous amine can be used for the neutralization instead of the hydroxide. In addition, when the base is volatile, an excess can be used and any remaining can be removed by evaporation.

The products obtained in this invention are sometimes hydrates, which can be, with the exception of when M is hydrogen, dehydrated by known procedures.

In addition, products of this invention where R and R' are both hydrogen can be converted to products of this invention where R and at most one R' are each alkyl, cycloalkyl or aralkyl, as previously defined. This reaction is a hydrocarbylation reaction employing the hydrocarbylating reagent $R'''_gZ$, where R''' is one of the hydrocarbyl groups defined previously in the definition of R' and Z is a leaving group of valence $g$. The term "leaving group" is used as described in Gould, "Mechanism and Structure in Organic Chemistry," Holt-Dryden, 1959, p. 261. Preferably, Z is chloride, bromide, iodide, sulfate, or a $C_1$–$C_7$ hydrocarbonsulfonate free of aliphatic unsaturation, i.e., any unsaturation present is aromatic. Thus, examples of $R'''_gZ$ include dimethyl sulfate, methyl iodide, benzyl chloride, methyl p-toluenesulfonate, ethyl p-nitrobenzenesulfonate, butyl methanesulfonate, isopropyl butanesulfonate, dodecyl p-toluenesulfonate, and the like. This process is similar to and includes the same reagents and, in general, the same hydrocarbyl groups as are used to hydrocarbylate an organic amine, or hydrochloride thereof, and needs no further amplification. The hydrocarbylation proceeds rapidly at moderate temperatures (15–45° C.) and atmospheric pressures.

In the products of this invention, preferably only at most two R and R' groups on the same nitrogen are alkyl, cycloalkyl or aralkyl, defined as previously and are the same. Further, it is preferred that both $B_{10}C$ entities in the anion are the same. These compounds can be represented by the formula $$M_a[(B_{10}H_{10}CNRR'_m)_2M']$$

Especially preferred are those compounds wherein the R and R' groups are hydrogen. These can be represented by the formula $$M_a[(B_{10}H_{10}CNH_m')_2M']$$

wherein $m'$ is a whole number of 2 or 3.

An examination of the formulas set forth heretofore reveals that $m$ and $n$ can be 1 or 2 and $m'$ can be 2 or 3. The reason for this is that each $B_{10}C$ entity contains an amino group which may or may not be protonated.

In the presence of excess base, the unprotonated form is present; in the presence of excess acid, the protonated form is present. Since the number of negative charges on the $B_{10}C$ entity is different in acidic medium from the number of such charges in basic medium, the valence of the anion in brackets and therefore the number of cations. M, will depend on the pH of the medium in which the particular product is present or from which it is isolated.

Furthermore, by suitable control of the process of acidifying a compound containing a nonprotonated entity $B_{10}H_{10}CNRR'^{3-}$, the degree of protonation can be regulated. For instance, Examples II, IV, and X show the formation of products in which one $B_{10}$ entity is $$B_{10}H_{10}CNH_2^{3-}$$

and the other is $B_{10}H_{10}CNH_3^{2-}$. In addition, Example II shows the formation of a product in which the average degree of protonation is between that of a "half-protonated" product and a fully protonated one. Correspondingly, in the reverse reaction, i.e., the deprotonation of a compound containing a protonated entity $$B_{10}H_{10}CNHRR'^{2-}$$

the degree of deprotonation can be regulated by controlling the process of basification.

Additionally, those compounds of the invention wherein R and R' are hydrogen can be reacted with nitrous acid to obtain products of the formula $$M_b[(B_{10}H_{10}COH)_2M']$$

wherein M and M' are as previously defined and $b$ is a cardinal number of 2–4, inclusive, and is defined by the equation $b = 6 - s$. In this reaction, temperature, pressure, time, and reaction proportions are not critical. Preferably, room temperature and atmospheric pressure are employed. These products are a part of the present invention.

The following examples illustrate in further detail the products and processes of this invention. These examples are illustrative only and are not intended to be limiting.

Example I (A) A solution of $B_{10}H_{12}CNH_3$ in 50% aqueous sodium hydroxide was prepared and mixed with cobalt(II) chloride hexahydrate. The mixture was heated briefly over a flame and then filtered to obtain a yellow filtrate. The addition of tetramethylammonium chloride to the filtrate precipitated a yellow solid, which was separated by filtration and characterized as $$[(CH_3)_4N]_3[B_{10}H_{10}CNH_2]_2Co$$

by infrared analysis.

(B) Acidification of the final filtrate of Part A precipitated a yellow solid which was recrystallized from water to obtain golden yellow crystalline $$(CH_3)_4N(B_{10}H_{10}CNH_3)_2Co$$

Analysis.—Calcd. for $(CH_3)_4N(B_{10}H_{10}CNH_3)_2Co$: C, 16.9; H, 8.9; N, 9.8. Found: C, 16.8; H, 8.7; N, 9.9.

Example II (A) A solution of $B_{10}H_{12}CNH_3$ (3 g.) in 25 ml. of 50% aqueous sodium hydroxide was added to a solution of $CoCl_2 \cdot 6H_2O$ (11 g.) in 15 ml. of water. The solution was allowed to stand for two minutes with occasional swirling and stirring. Thirty ml. of water was added and the mixture was filtered through diatomaceous earth ("celite") and the solid was washed down with water. The total volume of filtrate plus washings was 90 ml. This was cooled in an ice bath and acidified with 20 ml. of 12 M hydrochloric acid. The addition of tetramethylammonium chloride (10 g.) precipitated a yellow solid which comprised 1.8 g. of a mixture of $$(CH_3)_4N(B_{10}H_{10}CNH_3)_2Co$$

and $[(CH_3)_4N]_2B_{10}H_{10}CNH_2CoB_{10}H_{10}CNH_3$ of average composition $[(CH_3)_4N]_{1.54}(B_{10}H_{10}CNH_{2.73})_2Co$.

Analysis.—Calcd. for $$[(CH_3)_4N]_{1.54}(B_{10}H_{10}CNH_{2.73})_2Co$$

B, 46.2; H, 9.6; Co, 12.6; N.E. 468 (monobasic), 234 (dibasic), 156 (tribasic). Found: B, 46.9; H, 9.6; Co, 12.6; N.E. 468, 234, 156.

$$U.V._{\lambda_{max.}}^{H_2O}$$

427 ($\epsilon$ 369), 285 ($\epsilon$ 35,900).

The neutral equivalents were determined by passage of an aqueous solution of this salt through an acidic ion exchange column followed by titration of the effluent with sodium hydroxide.

(B) An aqueous solution of part of the above tetramethylammonium salt was passed through an acidic ion exchange column. Exaporation of the effluent left an orange solid which was a hydrate of $H(B_{10}H_{10}CNH_3)_2Co$.

(C) The remainder of the tetramethylammonium salt of Part A was recrystallized from 5% aqueous tetramethylammonium hydroxide to give $$[(CH_3)_4N]_2B_{10}H_{10}CNH_2CoB_{10}H_{10}CNH_3$$

as a yellow solid.

Analysis.—Calcd. for $$[(CH_3)_4N]_2B_{10}H_{10}CNH_2CoB_{10}H_{10}CNH_3$$

C, 23.9; H, 9.9; Co, 11.8; N, 11.2. Found: C, 23.9; H, 10.2; Co, 11.9; N, 11.0

$$U.V._{\lambda_{max.}}^{CH_3CN} \ 422 \ (\epsilon \ 460), \ 281 \ (\epsilon \ 42,000)$$

(D) The pH of an aqueous solution of $$H(B_{10}H_{10}CNH_3)_2Co$$

prepared as in Part B, was adjusted to 5.5 by addition of tetramethylammonium hydroxide.

$$(CH_3)_4N(B_{10}H_{10}CNH_3)_2Co$$

precipitated as a yellow solid and was separated by filtration and dried in vacuo.

Analysis.—Calcd. foa $(CH_3)_4N(B_{10}H_{10}CNH_3)_2Co$; C, 16.9; H, 8.9; Co, 13.8. Found: C, 16.6; H, 9.0; Co, 13.8.

$$U.V. \lambda_{max.}^{H_2O} \ 426 \ (\epsilon \ 358), \ 284 \ (\epsilon \ 34,400)$$

Example III

A solution of $B_{10}H_{12}CNH_3$ (5.0 g.) in 40 ml. of 50% aqueous sodium hydroxide was added to 19 g. of $CoCl_2 \cdot 6H_2O$ in 25 ml. of water. The mixture was allowed to stand with periodic agitation for four minutes. Water (20 ml.) was added, the mixture was filtered through "celite," and the solid was washed down with water. The total volume of the filtrate plus washings was 130 ml. This was divided into two equal portions. One portion was treated with 10 g. of tetramethylammonium chloride to precipitate $[(CH_3)_4N]_3(B_{10}H_{10}CNH_2)_2Co$, characterized by infrared analysis. The other portion of the filtrate was treated with 20 ml. of 50% aqueous cesium hydroxide solution to precipitate $$Cs_3(B_{10}H_{10}CNH_2)_2Co \cdot H_2O$$

a yellow solid, also characterized by infrared analysis.

When the above cesium salt is treated with ceric ammonium sulfate in dilute sulfuric acid, the $$[B_{10}H_{10}CNH_2)_2Co]^{3-}$$

anion will be oxidized to the 2— anion.

Example IV (A) A solution of $B_{10}H_{12}CNH_3$ (3 g.) in 25 ml. of 50% aqueous sodium hydroxide was added to a solution of $NiCl_2 \cdot 6H_2O$ (11 g.) in 15 ml. of water. The mixture was allowed to stand for 2 minutes with occasional agitation. Ten ml. of water was added, the mixture was filtered through "celite," and the solid was washed down with water. The filtrate plus washings had a combined volume of 100 ml. and constituted a dark yellow solution. There was added 20 ml. of 12 M hydrochloric acid with simultaneous cooling in a water-ice bath. The addition of tetramethylammonium chloride (10 g.) precipitated $(CH_3)_4NB_{10}H_{10}CNH_2NiB_{10}H_{10}CNH_3$ as a yellow solid which was recrystallized from water.

*Analysis.*—Calcd. for $$(CH_3)_4NB_{10}H_{10}CNH_2NiB_{10}H_{10}CNH_3$$

B, 50.7; C, 16.9; H, 8.7; N, 9.8; Ni, 13.8. Found: B, 50.4; C, 16.4; H, 8.6; N, 9.7; Ni, 13.9.

U.V. $\lambda_{max.}^{H_2O}$ 285 ($\epsilon$ 31,400)

(B) Passage of an aqueous solution of $$(CH_3)_4NB_{10}H_{10}-CNH_2NiB_{10}H_{10}CNH_3$$

through an acidic ion exchange column followed by evaporation of the effluent to dryness left $$(B_{10}H_{10}CNH_3)_2Ni$$

as a crystalline yellow-orange solid.

Example V

A solution of $B_{10}H_{12}CNH_3$ (5.0 g.) in 40 ml. of 50% aqueous sodium hydroxide was added to a solution of $NiCl_2 \cdot 6H_2O$ (19.0 g.) in 25 ml. of water. The mixture was allowed to stand for four minutes with periodic agitation. Water (20 ml.) was added, the mixture was filtered through "celite," and the solid was washed down with water. The total volume of filtrate plus washings was 146 ml. This was divided into two equal portions. Tetramethylammonium chloride (10 g.) was added to one portion to precipitate $[(CH_3)_4N]_2(B_{10}H_{10}CNH_2)_2Ni$; the addition of 20 ml. of 50% aqueous cesium hydroxide to the other portion precipitated $$Cs_2(B_{10}H_{10}CNH_2)_2Ni \cdot H_2O$$

Both of these salts were yellow-orange. They were recrystallized from water and characterized by infrared analysis. The tetramethylammonium salt was analyzed:

*Analysis.*—Calcd. for $[(CH_3)_4N]_2(B_{10}H_{10}CNH_2)_2Ni$: B, 43.3; C, 24.0; H, 9.7; N, 11.2; N.E. 500 (monobasic). Found: B, 43.1; C, 24.6; H, 10.0; N, 11.5; N.E. 503.

The neutral equivalent was determined by passing an aqueous solution of $[(CH_3)_4N]_2(B_{10}H_{10}CNH_2)_2Ni$ through an acidic ion exchange column to obtain a solution of $(B_{10}H_{10}CNH_3)_2Ni$ and titrating this solution with aqueous sodium hydroxide. The two acidic protons were not equal in acid strength; the second was extremely weak and difficult to detect.

Example VI

Fifty ml. of a 1.6 molar solution of butyllithium in hexane was added to a solution of $B_{10}H_{12}CNH_3$ (3 g.) in 100 ml. of tetrahydrofuran in a nitrogen atmosphere. The resulting mixture was cooled to 7° C. and anhydrous ferrous chloride (3 g.) was added. This mixture was stirred for one hour; the supernatant tetrahydrofuran was decanted and the residue was washed one time with a small amount of tetrahydrofuran. The residue was extracted with 40 ml. of water. The extract was filtered through "celite." A catalytic amount of ferric chloride was added to the filtrate and air was passed through it for twenty minutes. The filtrate was then refiltered through "celite." Acidification with hydrochloric acid followed by the addition of tetramethylammonium chloride precipitated $(CH_3)_4N(B_{10}H_{10}CNH_3)_2Fe$ as a dark green solid (2.8 g.). This was successively extracted with two portions of hot water. The crystals separating from the second extract upon cooling were analyzed.

*Analysis.*—Calcd. for $(CH_3)_4N(B_{10}H_{10}CNH_3)_2Fe$: B, 51.0; C, 17.0; H, 9.0; N, 9.9; Fe, 13.1. Found: B, 50.0; C, 17.1; H, 9.5; N, 9.7; Fe, 13.3.

U.V. $\lambda_{max.}^{H_2O}$ 585 ($\epsilon$ 270), 400 ($\epsilon$ 960), 292 ($\epsilon$ 19,300), 273 ($\epsilon$ 20,600)

If the product of this example is reacted with sodium borohydride in aqueous solution, the $$[(B_{10}H_{10}CNH_3)_2Fe]^-$$

will be reduced to $[(B_{10}H_{10}CNH_3)_2Fe]^{2-}$.

Example VII (A) A solution of $B_{10}H_{12}CNH_3$ in aqueous sodium hydroxide was added to an aqueous solution of $$NiCl_2 \cdot 6H_2O$$

The mixture was allowed to stand briefly with periodic agitation. It was then filtered. Excess dimethyl sulfate was added to the filtrate and the mixture was heated. A red solid precipitated. This was separated and dissolved in aqueous sodium hydroxide. The solution was filtered and divided into two equal parts. One was acidified to precipitate $[B_{10}H_{10}CNH(CH_3)_2]_2Ni$, characterized by infrared analysis.

(B) The other part of the solution obtained in Part A was mixed with tetramethylammonium chloride to precipitate $[(CH_3)_4N]_2[B_{10}H_{10}CN(CH_3)_2]_2Ni$, identified by infrared analysis.

(C) Dimethyl sulfate (12 g.) was added to a solution of $(B_{10}H_{10}CNH_3)_2Ni$ (5 g.) in 100 ml. of 10% aqueous sodium hydroxide. The resulting mixture was stirred for three hours to obtain a red solution. Acidification of this with hydrochloric acid precipitated $$(B_{10}H_{10}CNH(CH_3)_2)_2Ni$$

as an orange solid. This was dissolved in a solution of 100 ml. of water and 12 ml. of 10% aqueous sodium hydroxide. This solution was filtered. A portion of the filtrate was reacidified with hydrochloric acid; the precipitated $[B_{10}H_{10}CNH(CH_3)_2]_2Ni$ was washed thoroughly with water and dried at 80° C. in vacuo.

*Analysis.*—Calcd. for $[B_{10}H_{10}CNH(CH_3)_2]_2Ni$: C, 17.6; H, 8.4; N, 6.8; B, 53.0; Ni, 14.3. Found: C, 17.7; H, 8.9; N, 7.2; B, 52.97; Ni, 14.3.

U.V. $\lambda_{max.}^{CH_3CN}$ 437 ($\epsilon$ 2100), 330 ($\epsilon$ 16,500), 288 ($\epsilon$ 28,000)

(D) Another portion of the basic filtrate of Part C was treated with aqueous cesium hydroxide to precipitate $Cs_2(B_{10}H_{10}CN(CH_3)_2)_2Ni$. This was recrystallized from water and dried at 80° C. in vacuo. It was a yellow-orange solid.

*Analysis.*—Calcd. for $Cs_2[B_{10}H_{10}CN(CH_3)_2]_2Ni$: C, 10.7; H, 4.8; N, 4.2. Found: C, 13.4; H, 6.0; N, 5.9.

U.V. $\lambda_{max.}^{CH_3CN}$ 435 ($\epsilon$ 1540), 288 ($\epsilon$ 42,000)

Example VIII

A suspension of $B_{10}H_{12}CN(CH_3)_3$ in 50% aqueous sodium hydroxide was heated briefly over a flame and excess $CoCl_2 \cdot 6H_2O$ was added. The mixture was heated on a steam bath for ten minutes and then filtered through "celite" to obtain a brownish-yellow filtrate. The addition of aqueous 50% cesium hydroxide solution precipitated a brownish-yellow solid which contained $$Cs[B_{10}H_{10}CN(CH_3)_3]_2Co$$

The reaction was repeated and the product anion was precipitated as a tetramethylammonium salt. Proton NMR analysis indicated the presence of two types of methyl groups in the ratio of 3.1 to 1.9 compared to the theoretical 3:2 for $(CH_3)_4N[B_{10}H_{10}CN(CH_3)_3]_2Co$.

Example IX

Fifty ml. of a solution of butyllithium in hexane (1.6 molar) was added to 100 ml. of tetrahydrofuran containing 3 g. of $B_{10}H_{12}CN(CH_3)_3$. The mixture was cooled to 6° C. and $FeCl_2$ (3 g.) was added, resulting in a temperature rise to 9° C. The mixture was stirred one hour; the cooling bath was removed and stirring was continued for 18 hours. The mixture was filtered. The filter cake was extracted with water and the extract was filtered through "celite." The filtrate was combined with 100 mg. of $FeCl_3$ and air was passed through this solution for one hour. The solution was again filtered through "celite" and 15 ml. of 50% aqueous cesium hydroxide was added. The resulting precipitate was recrystallized twice from water and then dried in vacuo at 80° C. to obtain a brown solid which was impure $Cs[B_{10}H_{10}CN(CH_3)_3]_2Fe$.

*Analysis.*—Calcd. for $Cs[B_{10}H_{10}CN(CH_3)_3]_2Fe$: C, 16.9; H, 6.7; N, 4.9. Found: C, 18.4; H, 5.8; N, 3.1.

Example X (A) Three grams of $NiCl_2 \cdot 6H_2O$ was added to a solution of $B_{10}H_{12}CNH_3$ (1.0 g.) in 20 ml. of 5% aqueous sodium hydroxide. The resulting solution was essentially neutral to pH paper. A small part was heated briefly in a flame. It became black and was filtered. The filtrate plus tetramethylammonium chloride precipitated a dark-brown solid, shown by infrared analysis to be crude $(CH_3)_4NB_{10}H_{10}CNH_2NiB_{10}H_{10}CNH_3$ (B) The remainder of the initial reaction solution from Part A (18 ml.) was mixed with two ml. of 50% aqueous sodium hydroxide. The green solution immediately thickened and developed a yellowish cast. It was filtered. The addition of tetramethylammonium chloride to the filtrate precipitated $[(CH_3)_4N]_2(B_{10}H_{10}CNH_2)_2Ni$ as a yellow solid, identified by infrared analysis.

Example XI

A solution of $NiCl_2 \cdot 6H_2O$ (3.7 g.) in 5 ml. of water was added to a mixture of $B_{10}H_{12}CNH_2CH_2C_6H_5$ (1 g.) and 25 ml. of 20% aqueous sodium hydroxide. The reaction mixture was heated on a steam bath for four minutes and then filtered through "celite." Acidification of the filtrate precipitated 0.8 g. of a dark solid. Recrystallization of this from aqueous alcohol gave orange, crystalline $(B_{10}H_{10}CNH_2CH_2C_6H_5)_2Ni$. Infrared analysis was in accord with this structure.

*Analysis.*—Calcd. for $(B_{10}H_{10}CNH_2CH_2C_6H_5)_2Ni$: C, 36.0; H, 7.2; N, 5.2. Found: C, 35.5; H, 7.9; N, 5.0.

$U.V. \lambda_{max.}^{CH_3CN}$ 427 ($\epsilon$ 1990), 318 ($\epsilon$ 21,000), 287 ($\epsilon$ 22,700)

The product of this example can be methylated with dimethyl sulfate by essentially the method of Example VII–C to give $[B_{10}H_{10}CNH(CH_3)CH_2C_6H_5]_2Ni$.

Example XII

In a nitrogen atmosphere, anhydrous manganese(II) chloride was added, at 5–8° C., to a mixture prepared from $B_{10}H_{12}CNH_3$ (5.0 g.), 1,2-dimethoxyethane (200 ml.) and a 1.6 M solution of butyllithium in hexane (80 ml.). The resulting mixture was stirred for thirty minutes. A viscous oil separated. The supernatant liquid was decanted and the oil was dissolved in 40 ml. of water. The addition of 40 ml. of 10% aqeuous sodium hydroxide followed by tetramethylammonium chloride precipitated $[(CH_3)_4N]_2(B_{10}H_{10}CNH_2)_2Mn$. This recrystallized from 50% aqueous ethanol as black needles; its identity was confirmed by infrared analysis.

*Analysis.*—Calcd. for $[(CH_3)_4N]_2(B_{10}H_{10}CNH_2)_2Mn$: B, 42.6; C, 23.6; H, 9.1; Mn, 10.8. Found: B, 41.7; C, 23.1; H, 9.4; Mn, 12.4.

By substituting anhydrous chromium(III) chloride for the manganese chloride in essentially the procedure of Example XII, the compound $[(CH_3)_4N]_3(B_{10}H_{10}CNH_2)_2Cr$ can be prepared.

Example XIII

The addition of aqueous tetraphenylarsonium chloride to a solution of $Na_2(B_{10}H_{10}CNH_2)_2Ni$, prepared from $(B_{10}H_{10}CNH_3)_2Ni$ and dilute sodium hydroxide, precipitated $(\phi_4As)_2(B_{10}H_{10}CNH_2)_2Ni$ as a yellow-orange solid. This was removed by filtration and characterized by infrared analysis.

Example XIV

Twelve molar hydrochloric acid (5 ml.) was added dropwise with stirring to a solution of $(B_{10}H_{10}CNH_3)_2Ni$ (1 g.) and sodium nitrite (5 g.) in 75 ml. of water, resulting in a temperature increase to 30° C. Stirring was continued for thirty minutes. Tetramethylammonium chloride (2 g.) was added, resulting in the precipitation of $[(CH_3)_4N]_2(B_{10}H_{10}COH)_2Ni$ as a yellow-orange solid. This was recrystallized from water.

*Analysis.*—Calcd. for $[(CH_3)_4N]_2(B_{10}H_{10}COH)_2Ni$: C, 24.0; H, 9.2; B, 43.1; N, 5.6; Ni, 11.8. Found: C, 24.0; H. 9.4; B, 42.9; N, 5.8; Ni, 11.7.

$U.V. \lambda_{max.}^{CH_3CN}$ 302 ($\epsilon$ 41,700)

The starting reactants used in the processes of the invention are prepared as follows:

$B_{10}H_{12}CNH_3$ is prepared as described in applicant's copending application Ser. No. 463,336, filed June 11, 1965. Specifically, a mixture of decaborane (12 gm.) 9.8 mmoles), sodium cyanide (0.31 mole), and water (300 ml.) is stirred until the decaborane is essentially all dissolved. The solution of $Na_2B_{10}H_{13}CN$ thus formed is filtered and the filtrate passed through an ion-exchange column filled with "amberlite" IR 120(H) resin in excess of that needed to remove all of the sodium cation. The effluent solution is evaporated to dryness on a steam bath. The residue is stirred in 150 ml. of ether and the mixture filtered. This filtrate is evaporated to dryness; the residue dissolved in a small amount and evaporated to dryness on a steam bath to obtain 8.3 g. (57% yield) of $B_{10}H_{12}CNH_3$.

$B_{10}H_{12}CNH_2R''$, where $R''$ is one of the hydrocarbyl groups defined in R, previously, is prepared as described in assignee's copending application Ser. No. 463,335, filed June 11, 1965. Specifically, decarborane ($B_{10}H_{14}$) is reacted with an isocyanide of the formula $R''NC$ at a temperature of 60° to 100° C. in an inert solvent such as benzene.

Starting reactants containing two or more of the hydrocarbyl groups defined above are obtained by hydrocarbylating the $B_{10}H_{12}CNH_2R''$ or $B_{10}H_{12}CNH_3$ in the hydrocarbylating procedure as described hereinabove. This procedure is also described in application Ser. No. 463,335.

All the products of this invention are colored solids and have utility as coloring agents in glassware, plastics and the like. In addition, the products of this invention are useful as dyes for cloth or fabrics, as shown by the following examples:

Example A

A dye test swatch containing various fabrics was immersed in a boiling aqueous solution of $(CH_3)_4N(B_{10}H_{10}CNH_3)_2Fe$ for about 30 seconds. It was then removed and rinsed with water. Wool, silk and nylon fabrics had been dyed a medium-to-dark greenish brown. Polyacrylonitrile (two different commercial fabrics), cotton and viscose rayon had been dyed a light greenish-brown.

Example B

An experiment similar to Example A was conducted with $Cs_2(B_{10}H_{10}CNH_2)_2Ni$ in place of the iron compound. Wool, silk and nylon were dyed medium-to-dark yellow; viscose rayon, cellulose acetate, cotton and polyacrylonitrile (three different commercial fabrics) were dyed light yellow.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds represented by the formula $$M_a[(B_{10}H_{10}CNRR'_m)M'(B_{10}H_{10}CNRR'_n)]$$

wherein

M is a cation selected from the group consisting of an alkali metal, one equivalent of an alkaline-earth metal, silver, ammonium, $QNH_3^+$, $QQ'NH_2^+$, $QQ_2'NH^+$, $QQ_3'N^+$, $Q_4P^+$, $Q_3S^+$, $Q_4As^+$, and $Q_4Sb^+$ wherein Q is an aliphatically saturated hydrocarbyl group of up to 18 carbon atoms and Q' is a Q group that is bonded to N through aliphatic carbon and any two Q and Q' groups in one cation can be covalently joined together to form a divalent group of up to 18 carbon atoms selected from the class consisting of aliphatically saturated hydrocarbon and aliphatically saturated monooxahydrocarbon, and when each of m and n is 2, hydrogen;

R is selected from the class consisting of hydrogen, alkyl of up to 18 carbon atoms, cycloalkyl of 4–30 carbon atoms, and aralkyl of 7–18 carbon atoms;

R' is selected from the class consisting of hydrogen alkyl of up to 18 carbon atoms, cycloalkyl of 4–18 carbon atoms, and aralkyl of 7–18 carbon atoms, in which the carbon atom bonded to the nitrogen in each of the three groups bears at least one hydrogen;

m and n are whole numbers selected from the class consisting of 1 and 2;

M' is selected from the group consisting of Fe(II), Fe(III), Cr(III), Mn(IV), Co(III), Co(IV), and Ni(IV); and a represents a cardinal number 0–4, inclusive, and is defined by the equation $a=8-m-n-s$ where s is the oxidation state of the transition metal M'.

2. Compounds of claim 1 wherein M' is selected from the class consisting of Mn(IV), Fe(III), Co(III), Cr(III), and Ni(IV).

3. Compounds of claim 1 represented by the formula $$M_a[(B_{10}H_{10}CNRR'_m)_2M']$$

4. Compounds of claim 1 wherein R and R' are each hydrogen.

5. A compound of claim 1 having the formula $$[(CH_3)_4N]_2(B_{10}H_{10}CNH_2)_2Mn$$

6. A hydrate of a compound of claim 1 having the formula $$H(B_{10}H_{10}CNH_3)_2Co$$

7. A compound of claim 1 having the formula $$[(CH_3)_4N]_2B_{10}H_{10}CNH_2CoB_{10}H_{10}CNH_3$$

8. A compound of claim 1 having the formula $$(B_{10}H_{10}CNH_3)_2Ni$$

9. A compound of claim 1 having the formula $$(CH_3)_4N(B_{10}H_{10}CNH_3)_2Fe$$

10. A compound of the formula $$M_b[(B_{10}H_{10}COH)_2M']$$

wherein

M is a cation selected from the group consisting of hydrogen, an alkali metal, one equivalent of an alkaline-earth metal, silver, ammonium, $QNH_3^+$, $QQ'NH_2^+$, $QQ'_2NH^+$, $QQ'_3N^+$, $Q_4P^+$, $Q_3S^+$, $Q_4As^+$, and $Q_4Sb^+$, wherein Q is an aliphatically saturated hydrocarbyl group of up to 18 carbon atoms, Q' is a Q group that is bonded to N through aliphatic carbon, and any two Q and Q' groups in one cation can be covalently joined together to form a divalent group of up to 18 carbon atoms selected from the class consisting of aliphatically saturated hydrocarbon and aliphatically saturated monooxahydrocarbon;

M' is selected from the group consisting of Fe(II), Fe(III), Cr(III), Mn(IV), Co(III), Co(IV), and Ni(IV); and b is a cardinal number of 2–4 inclusive, and is defined by the equation $b=6-s$ where s is the oxidation state of the transition metal M'.

11. Process which comprises reacting, in the presence of an inert solvent, a boron compound of the formula $$B_{19}H_{12}CNRR'_2$$

wherein R and R' are defined as in claim 1, with a base selected from the group consisting of an alkyllithium, an aryllithium, an alkaryllithium, each of up to 12 carbon atoms, an alkali metal, and an alkali-metal hydride; followed by the addition of a compound selected from the group consisting of $M'''Z_3$ and $M'^VZ_2$ wherein M''' is selected from the group consisting of Fe(III) and Cr(III), and M'$^V$ is selected from the group consisting of Mn(II), Fe(II), Co(II) and Ni(II), and Z is selected from the group consisting of chlorine, bromine and iodine, said steps being carried out at a temperature range of between $-50°$ C. and $+100°$ C.

12. Process which comprises reacting a boron compound of the formula $$B_{10}H_{12}CNRR'_2$$

wherein R and R' are defined as in claim 11, with a 1–50% aqueous alkali-metal hydroxide solution; followed by the addition of a compound selected from the class consisting $CoZ_2$ and $NiZ_2$ wherein Z is selected from the class consisting of chlorine, bromine and iodine, said steps being carried out at a temperature range of the freezing point of the alkali-metal hydroxide solution and $+100°$ C.

References Cited

UNITED STATES PATENTS 3,376,343    4/1968    Knoth _____ 260—567.6

TOBIAS E. LEVOW, *Primary Examiner.*

A. P. DEMERS, *Assistant Examiner.*

U.S. Cl. X.R.

8—4, 57, 55; 106—47; 260—270, 313.1, 430, 439, 441, 242

UNITED STATES PATENT OFFICE
CERTIFICATE OF CORRECTION

Patent No. 3,424,773  
January 28, 1969

Walter H. Knoth, Jr.

It is certified that error appears in the above identified patent and that said Letters Patent are hereby corrected as shown below:

Column 11, line 26, "hydrogen" should read -- hydrogen, --. Column 12, line 25, the formula should read -- $B_{10}H_{12}CNRR'_2$ --.

Signed and sealed this 31st day of March 1970.

(SEAL)  
Attest:

Edward M. Fletcher, Jr.  
Attesting Officer

WILLIAM E. SCHUYLER, JR.  
Commissioner of Patents